Figure 1:
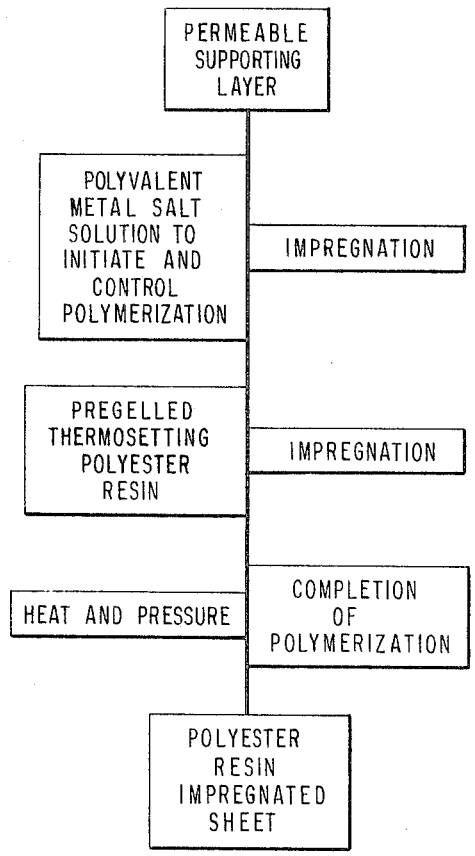

Sept. 6, 1966       P. P. W. VARLET       3,271,183

PROCESS FOR PRODUCING SHEETS OF REINFORCED POLYESTER RESIN

Filed Aug. 3, 1962       2 Sheets-Sheet 1

INVENTOR
PIERRE PAUL WILLIAM VARLET

BY
ATTORNEY

United States Patent Office 3,271,183
Patented Sept. 6, 1966

3,271,183
PROCESS FOR PRODUCING SHEETS OF
REINFORCED POLYESTER RESIN
Pierre Paul William Varlet, Asnieres, France, assignor to
Societe Anonyme des Usines Chausson, Asnieres,
France, a company of France
Filed Aug. 3, 1962, Ser. No. 214,523
Claims priority, application France, Dec. 3, 1958,
780,703, Patent 1,217,742
15 Claims. (Cl. 117—47)

This application is a continuation-in-part of application Serial No. 853,990, filed November 19, 1959, now abandoned.

This invention relates to an improved method for the manufacture of reinforced plastic sheets and plates and to the production of various articles obtained by the shaping of such sheets and plates.

In accordance with the invention, there are provided novel industrial products in the form of plastic sheets and plates having a smooth and nonadherent surface, and great malleability and capable of being readily shaped or stamped into desired objects by operations similar to those employed with steel sheets and plates.

The method of the invention comprises the steps of first impregnating a supporting layer of a permeable reinforcing material with a substance capable of initiating and then controlling the polymerization of a thermosetting polyester resin which is subsequently applied and which forms the body of the sheet or plate. The impregnated reinforcing or supporting layer is then subjected to a polymerization treatment to convert the resin to a fully thermoset condition.

Copending application Serial No. 853,989, now abandoned, disclosed a method for preparing an impregnated supporting layer whereby permeable reinforcing material, first impregnated with a polymerization control agent, is further impregnated with a thermosetting polyester resin together with a polymerization catalyst therefor. The impregnated material is then heated to initiate polymerization, the resin going to a partially polymerized gel state induced by the action of the polymerization initiating and controlling agent originally provided. Finally complete polymerization is achieved by the application of heat and pressure, under the action of the polymerization catalyst.

In accordance with the present invention, there is provided an improved procedure whereby the working of the resulting sheet is facilitated when it is to be shaped by mechanical operations such as stamping. The present invention also provides a method of manufacturing the plastic sheet in such manner that it is free from excessive shrinkage when polymerized after shaping.

Among the advantages of the sheets and plates prepared in accordance with the invention is their ability to be kept for substantial periods of time without appreciable alteration of their characteristics and their retention of smooth and nonadherent surfaces. This is true even though the final polymerization which imparts great hardness to the sheets can take place at the moment when they are shaped by a heat treatment of very short duration, not exceeding a few seconds. Moreover, the handling of the sheets and plates is easy as their surfaces are smooth and do not stick.

Accordingly, it is an object of the invention to improve the plastic sheet disclosed in copending application Serial No. 853,989 in such a way that the working of said sheet is facilitated when it is subjected to stamping tools.

Another object of the invention is the preparation of the plastic sheet in such manner that it will not shrink excessively when polymerized after shaping.

Still another object is the provision of a method of manufacture which provides for the preparation of a large batch of resin to be further used for continuous impregnation of the permeable supporting material, which batch is capable of preservation for long periods with maintenance of its properties.

A still further object is to obtain a plastic article capable of storage for several weeks at ambient temperature without substantial variation in composition, so that the article can be at a selected time, shaped mechanically, then fully polymerized rapidly so as to prevent excessive shrinkage during polymerization, and with prevention of the shaping tools from adhesion to the article while shaping it.

Figure 2:
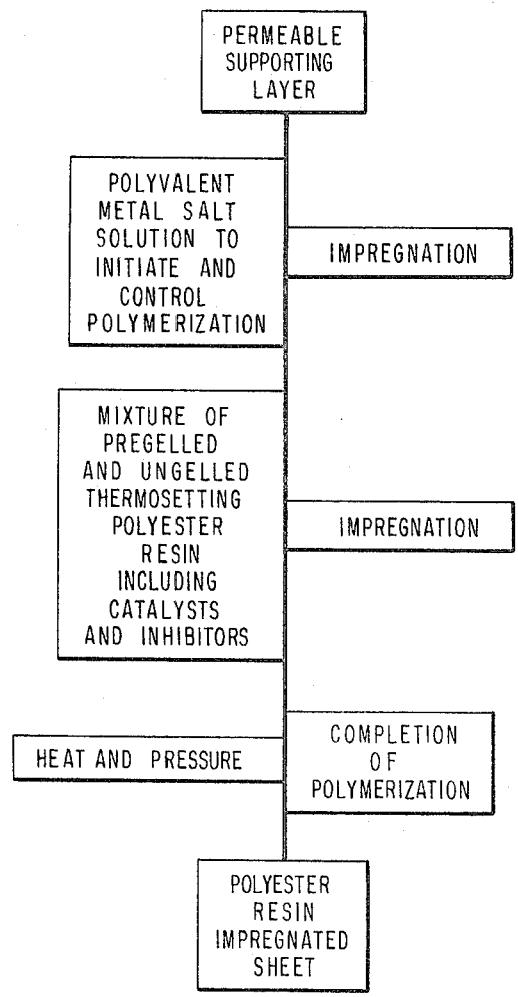

The invention will be better understood by reference to the accompanying drawings, in which:

FIG. 1 is a flowsheet depicting the manufacture of a polyester resin impregnated sheet, and FIG. 2 is a flowsheet of an alternative method of manufacture.

In accordance with the invention, a supporting layer of a permeable reinforcing material is first impregnated with a solution of a polymerization moderating or controlling agent, by any suitable method, as by dipping, spraying or coating. The function of this impregnating solution is to facilitate the polymerization of the resin preparations with which the permeable layer is subsequently impregnated.

The permeable reinforcing material may comprise any suitable layer of natural or synthetic fiber or fabric, such as, for example, glass fiber, paper, synthetic resin fabric or fiber, cloth, asbestos, and the like. One or more layers may be employed for impregnation.

The initial impregnating solution comprises a solution of one or more metal salts in a polyhydric alcohol. The metal of the metal salt is advantageously a polyvalent metal, such as, for example, tin, iron, zinc, boron, cobalt, or manganese. The salt may be formed from either an inorganic acid or an organic acid. Inorganic salts include for example, the halides and sulfates. Examples of metal salts include nonhydrated stannous chloride, ferrous chloride, zinc sulfate and cobalt naphthenate. Examples of suitable polyhydric alcohols for use as solvents include ethylene glycol, propylene glycol, glycerol, butane-1,2-diol, and the like.

In order that the impregnation of the permeable material will be homogeneous, the impregnant is advantageously diluted in a volatile solvent, such as, for example, a lower aliphatic alcohol, preferably ethyl alcohol.

After impregnation of the material, the solvent is evaporated so that the reinforcing material is perfectly dry. In certain cases in order to facilitate moistening of the reinforcing layer by the resinous impregnants subsequently applied the solution of the polymerization modifying agents is diluted with a suitable monomeric substance, such as a vinyl monomer, for example, vinyl aceate, in an amount sufficient to moisten all parts of the reinforcing layer.

In accordance with the invention, the previously prepared permeable layer is impregnated at least partially with a thermosetting type polyester resin which has previously been brought to a pregelled state. This pregelled state is such that the resin is stable at ambient temperature, and has been further subjected to a mixing step to increase its fluidity. After impregnation with the pregelled resin, the impregnated permeable layer is subjected at least on one of its faces to a more advanced polymerization step so as to form a smooth and nonadherent surface layer.

In accordance with another embodiment of the invention, the permeable layer is impregnated with a mixture of (a) a thermosetting polyester resin which has been pregelled as described above, and (b) a thermosetting polyester resin which has not been pregelled, but which contains chemical agents capable of initiating gelling to bring the resin to a pregelled state.

Numerous variations and supplemental procedures may be included with the basic methods outline above, as will become apparent as the description proceeds.

The expression polyester resin signifies a class of thermosetting synthetic resins produced by the esterification of polybasic organic acids with polyhydric alcohols. The esterifying acids may be unsaturated, for example, maleic acid, or they may include acids such as phthalic acid or terephthalic acid, or other acids in addition to the polybasic acid.

Polyester resins which are capable of being put into a partially polymerized gel state, and which are suitable for use in the novel method of the invention, include those obtained by copolymerization of unsaturated alkyd resins, products of polycondensation of unsaturated dicarboxylic acids and cross-linked divalent alcohols with vinyl or allyl monomers, or the esters of allyl alcohol with cross-linked monobasic or polybasic acids with or without inclusion of vinyl monomers. This type of polyester resins includes those resulting from the polycondensation of two or more of the following acids and alcohols and comonomers:

| Acids | Alcohols | Comonomers |
|---|---|---|
| Maleic acid. | Ethylene glycol. | Styrene. |
| Maleic anhydride. | Diethylene glycol. | Acrylonitrile. |
| Adipic. | Propylene glycol. | Methylstyrene. |
| Sebacic. | Polypropylene glycol. | Methyl acrylate. |
| Fumaric. | Glycerol. | Methyl methacrylate. |
| Chlormaleic. | 1,2-butanediol. | Vinyl acetate. |
| Succinic. | 1,3-butanediol. | Esters of allyl alcohol, |
| Tetrachlorphthalic. | 1,4-butanediol. | e.g. phthalates, adi- |
| Lauric. | Trimethylolpropane. | pate, maleate, cyan- |
| Caproic. | | urate. |
| Ricinoleic. | | |
| Hexachlorendomethylene-tetrahydrophthalic. | | |
| Endomethylene-tetrahydrophthalic. | | |

Specific thermosetting polyester resin compositions which are suitable for use in the process of the invention are shown in the following formulations, which are to be regarded as illustrative, and not as limiting:

COMPOSITION 1

Unsaturated polyester resin obtained by baking together:

| | Moles |
|---|---|
| Ethylene glycol | 5 |
| Maleic anhydride | 2.5 |
| Adipic acid | 0.5 |
| Phthalic anhydride | 2 |

100 parts of the foregoing composition, after baking, may be incorporated with 35 parts of methylstyrene.

COMPOSITION 2

| | Moles |
|---|---|
| Ethylene glycol | 5 |
| Propylene glycol | 1 |
| Maleic acid | 3 |
| Phthalic anhydride | 2 |

100 parts of the foregoing composition, after baking are incorporated with, for example, 33 parts of styrene.

COMPOSITION 3

| | Moles |
|---|---|
| Ethylene glycol | 4 |
| Propylene glycol | 1 |
| Maleic acid | 3 |
| Phthalic anhydride | 1.8 |
| Lauric acid | 0.2 |

The lauric acid is added at the end of the baking process. 100 parts of the foregoing mixture may be incorporated with 33 parts of styrene.

The polyester resin with which the permeable layer is impregnated contains any suitable type of polymerization catalyst for this class of resin, preferably an oxidizing or free radical type catalyst, such as, for example, a peroxide type catalyst, such as benzoyl peroxide. The resin may also have incorporated therein suitable fillers, pigments, and the like.

The purpose of the polymerization catalyst is to cause completion of the polymerization of the resin in the final stage of the process, and the catalyst is generally one which will have no activity or a negligible activity in connection with the first change of state of the resin, although it may exhibit a slight activity. The catalyst is intended to facilitate the polymerization of the resin at the final working of the sheet or plate.

There may be added to the resin, in addition to the polymerization catalyst, a polymerization inhibiting agent to act as a preservation agent or protector for the sheets or plates in which the resin is in the partially polymerized or gel state. Examples of suitable polymerization inhibitors are alkylated phenols, such as 4-methyl-2,6-ditertiary-butylphenol or dibutyl tertiary-p-cresol. These may be applied as a solution in an organic diluent, such as, for example, a 6% solution in styrene.

In accordance with a first embodiment of the invention, the permeable layer is impregnated with a pregelled thermosetting polyester resin. This resin, which may contain a filler, is prepared by admixing the polyester resin with a catalyst adapted to permit the initiating of the subsequent final polymerization step. The catalyst is selected so that its activity is as weak as possible with respect to the molecular transformation to which the resin must be subjected to bring it to the gel state. Any oxidizing or free radical type catalyst is suitable, such as, for example, benzoyl peroxide. A polymerization inhibiting agent is then added to the resin to keep the resin as long as possible in the gel state. This is preferably a solution of an alkylated phenol as mentioned previously.

The resin mixture is then brought to the stable gel state by adding a polymerization moderator of the type previously described, for example, a solution of a metal salt in ethylene glycol.

The following example discloses the method of preparation of a pregelled thermosetting polyester resin.

*Example 1*

A polyester resin composition having the following ingredients was prepared, using the resin designated as Composition 1, above:

| | | |
|---|---|---|
| Polyester resin | grams | 100 |
| Calcium carbonate filler | do | 30 |
| Benzoyl peroxide | do | 2 |
| 6% solution of 4-methyl-2,6-ditertiarybutylphenol in styrene | cc | 1 |
| 25% by wt. solution of stannous chloride $SnCl_2$ in ethylene glycol | cc | 2 |

This composition was maintained at ambient temperature, preferably less than about 45° C., causing the start of a fairly rapid polymerization reaction, then stabilizing and assuming the appearance of an extremely viscous coagulum which can be kept without change for several months. The composition may be subjected to mixing to increase its fluidity.

The previously impregnated permeable reinforcing material is impregnated on at least one of its faces with the above preparation and then subjected to further polymerization by the application of heat and pressure. For example, the glass fiber sheet previously impregnated with a substance capable of initiating and then controlling the polymerization, as described previously, is impregnated further with the pregelled resin preparation of Example 1, and then placed between two metal plates heated to a temperature of about 80° C. and a pressure of 100 g. per sq. cm. for 30 seconds to 1 minute, and then withdrawn and cooled.

In accordance with a second embodiment of the invention, the impregnating polyester resin is prepared in two distinct fractions. The first fraction is formed by bringing a polyester resin of the thermosetting type to a pregelled state, in the manner described in connection with Example 1. The second fraction is prepared in essentially the same manner, using the same ingredients, i.e. the same resin provided with the same catalysts, filler, and the like, but with the addition of a polymerization inhibiting agent which is much lower in concentration. Thus the concentration would be between about 20% and about 30%, advantageously about 25% of the concentration indicated in Example 1. Thus the second fraction of the impregnating resin will remain stable for several hours before commencing the polymerization process leading to the gel state defined above. The ratio between the two fractions may be varied within wide limits for impregnation purposes, in order to control the extent of the shrinkage to which the product finally obtained is subject at the moment of polymerization, which polymerization may take place a long time after the sheet or plate has been initially formed.

Articles prepared as described above can also be covered before being subjected to surface treatment by one or more thin coats of resin in the gel state, or before the transformation bringing them to that state, resulting in improvement of the article surface.

In the second embodiment of the invention, the permeable layer which has been previously impregnated with the polymerization initiating and controlling agent, is coated or impregnated with the two fractions of previously prepared thermosetting polyester resin, i.e. the pregelled fraction and the ungelled fraction. To facilitate this impregnation, the pregelled fraction is subjected to mixing in order to fluidize the coagulum which it forms. The second fraction is then added to the first fraction and the mixing continued to obtain a homogeneous coagulum of intermediate viscosity.

The following example, which is intended to be illustrative, and not limiting, shows the preparation of the first and second resin fractions.

*Example 2*

There is employed the resin designated as Composition 1, above. As the first resin fraction, there were employed 25 grams of the composition of Example 1, the pregelled product. The first fraction was first fluidized by stirring, and then mixed with the following composition:

| | |
|---|---|
| Polyester resin, same as first fraction _____grams__ | 75 |
| Calcium carbonate filler _____do____ | 30 |
| Benzoyl peroxide _____do____ | 1.24 |
| 6% solution of 4-methyl-2,6-ditertiarybutylphenol in styrene _____cc__ | 0.75 |
| 25% solution of $SnCl_2$ in ethylene glycol _____cc__ | 0.75 |

The second fraction was mixed with the first fraction with stirring to achieve a mixture of viscosity suitable for direct impregnation, with a doctor blade, or by other suitable means, of the reinforcing layer, which can comprise several coats.

*Example 3*

Using polyester resin designated as Composition 1, above, the first fraction was 40 grams of the preparation of Example 1. The second fraction had the composition:

| | |
|---|---|
| Polyester resin, same as first fraction _____grams__ | 60 |
| Calcium carbonate filler _____do____ | 30 |
| Benzoyl peroxide _____do____ | 1.30 |
| 6% solution of dibutyl-tertiary-p-cresol in styrene _____cc__ | 0.6 |
| 25% solution of $SnCl_2$ in ethylene glycol ____cc__ | 0.5 |

These fractions were admixed as described in Example 2.

In applying the mixed resin fractions to the permeable impregnated reinforcing layer, it is possible to impregnate simultaneously several reinforcing layers, or, on the other hand, to selectively impregnate each reinforcing layer and then laminate these together by a simultaneous calendering step.

Owing to the pregelling treatment of the gel fraction of the impregnating mixture, the subsequent shrinkage, which occurs at the time of transformation of the second resin fraction of the mixture into gel form, is very slight so that the calendering of the laminated product can be performed with accuracy even when the finished article must have a thickness within close tolerances.

The reinforcing layer impregnated with the two resin fractions is polymerized by application of heat and pressure between metal plates or belts, the plates or belts being heated to about 80°–85° C., for about 30 seconds, at a pressure of about 100 g. per sq. cm. The heat effect is stabilized by rapidly cooling the sheet or plate to bring it down to a temperature equal to or slightly less than ambient temperature. The sheets thus produced may be stored for several weeks at ambient temperature, one above the other, without any interlayers.

A subsequent stage of the process includes subjecting the sheet or plate obtained to a surface treatment which has the effect of making at least one of the faces non-adherent. This may be performed in a number of ways. In most cases it is advantageous to subject the face or faces to the action of polymerization accelerating agents, such as mono- or di-alkyl-anilines, or mixtures thereof. Examples of such accelerators include dimethylaniline or monomethylaniline. Such accelerator compositions may include other ingredients having lubricating properties to facilitate subsequent shaping operations. Thus, there may be employed a mixture of a wax and the accelerator, for example, stearamide, polyethylene wax, paraffin, hydrogenated castor oil, and the like. The lubricants are advantageously used in admixture with mono- or dialkyl phosphates or a mixture thereof, for example, ethyl phosphate and diethyl phosphate. Thus, a suitable polymerization accelerator, having a superficial action, is a mixture of dimethylaniline and diethyl phosphate, containing 2% by weight of the former.

When the sheet has been subjected to the above surface treatment, the sticky aspect of the mass of resin that has set to a gel is no longer perceptible, for the surface of the sheet reaches an intermediate stage between the gel state and the complete polymerization state. This intermediate state can, moreover, be regulated by modifying the quantity or composition of the material used for surface treatment.

In a modification of the process, the pregelled fraction and the ungelled fraction are prepared separately. The former is used for directly impregnating (after mixing) a support forming one of the elements of the reinforcement of a laminated sheet which it is desired to obtain. The second or ungelled fraction, is used separately for impregnating other reinforcing layers which have undergone a preimpregnation by the polymerization iniating and controlling agent. The impregnated layers are then brought together to make a sandwich, and are calendered and then subjected to surface treatment as before. Thus, some of the reinforcing layers may be impregnated only with the resin in the gel state, while other layers may be impregnated with the resin in the ungelled state but containing agents capable of causing gelling.

What is claimed is:
1. Process for the manufacture of reinforced polyester resin sheets capable of being shaped mechanically, which comprises the steps of first impregnating a supporting layer of a permeable reinforcing material with a solution in a diluent comprising at least one member selected from the group consisting of a polyhydric alcohol, a lower aliphatic alcohol, and a vinyl monomer, of a poly- valent metal salt soluble in said diluent, said polyvalent metal being selected from the group consisting of tin, iron, zinc, boron, cobalt and manganese, said salt being capable of initiating and then controlling the polymerization of said polyester resin upon heating below a predetermined temperature, then impregnating said impregnated reinforcing material at least partially with a thermosetting polyester resin which is in a pregelled state in which it is stable at ambient temperature, said resin having been previously brought to said pregelled state by admixing with a catalyst adapted to permit initiating of polymerization, with said polyvalent metal salt solution, and with a sufficient amount of an alkylated phenol to inhibit further polymerization and to maintain the resin in said pregelled state.

2. The process of claim 1 in which the pregelled resin is subjected to mixing to increase its fluidity prior to application to the reinforcing layer.

3. The process of claim 1 in which the supporting layer is first impregnated with a solution of a salt of said polyvalent metal in a polyhydric alcohol and then dried, prior to application of the resin.

4. The process of claim 1, in which the first impregnant is a solution of stannous chloride in ethylene glycol.

5. Process for the manufacture of reinforced polyester resin sheets capable of being shaped mechanically, which comprises the steps of first impregnating a supporting layer of a permeable reinforcing material with a solution in a diluent comprising at least one member selected from the group consisting of a polyhydric alcohol, a lower aliphatic alcohol, and a vinyl monomer, of a polyvalent metal salt soluble in said diluent, said polyvalent metal being selected from the group consisting of tin, iron, zinc, boron, cobalt and manganese, said salt being capable of initating and then controlling the polymerization of said polyester resin upon heating below a predetermined temperature, then impregnating said impregnated reinforcing material at least partially with a thermosetting polyester resin which is in a pregelled state in which it is stable at ambient temperature, said resin having been previously brought to said pregelled state by admixing with a catalyst adapted to permit initiating of polymerization, with said polyvalent metal salt solution, and with a sufficient amount of an alkylated phenol to inhibit further polymerization and to maintain the resin in said pregelled state, and then subjecting the impregnated layer to heat and pressure to complete the polymerization of the polyester resin, to form a smooth and nonadherent surface layer.

6. Process for the manufacture of reinforced polyester resin sheets capable of being shaped mechanically, which comprises the steps of first impregnating a supporting layer of a permeable reinforcing material with a solution in a diluent comprising at least one member selected from the group consisting of a polyhydric alcohol, a lower aliphatic alcohol, and a vinyl monomer, of a polyvalent metal salt soluble in said diluent, said polyvalent metal being selected from the group consisting of tin, iron, zinc, boron, cobalt and manganese, said salt being capable of initiating and then controlling the polymerization of said polyester resin upon heating below a predetermined temperature, then impregnating said impregnated reinforcing material with a mixture of (a) a thermosetting polyester resin which is in a pregelled state in which it is stable at ambient temperature, said resin having been previously brought to said pregelled state by admixing with a catalyst adapted to permit initiating of polymerization, with said polyvalent metal salt solution, and with a sufficient amount of an alkylated phenol to inhibit further polymerization and to maintain the resin in said pregelled state, and (b) a thermosetting polyester resin which is in the ungelled state and which contains a catalyst adapted to permit initiating of polymerization, and an amount of an alkylated phenol between about 20% and about 30% of that present in said pregelled resin.

7. The process of claim 6 in which the reinforcing layer is composed of several superposed previously impregnated separate reinforcing layers.

8. The process of claim 6 in which the reinforcing layer is composed of separate layers impregnated with polyester resin in the pregelled state, and with ungelled polyester resin.

9. The process of claim 6 in which the pregelled and the ungelled polyester resin components are first mixed to form a homogeneous fluid.

10. The process of claim 6 in which the polyester resin components each contain a polymerization inhibiting agent, the concentration of which is in the ungelled component about 25% of its concentration in the pregelled component.

11. The process of claim 10 in which the polymerization inhibiting agent is a solution of an alkylated phenol in styrene.

12. The process of claim 6 in which the polymerization accelerator aiding in the production of a thin polymerized surface layer is applied to at least one face of the impregnated reinforcing layer.

13. The process of claim 6 in which the supporting layer is first impregnated with a solution consisting essentially of said polyvalent metal salt, a polyhydric alcohol, and a vinyl monomer.

14. The process of claim 13 in which the vinyl monomer is vinyl acetate.

15. The process of claim 6 in which the impregnated layer is subjected to heat and pressure to complete polymerization of the polyester resin, to form a smooth and nonadherent surface layer.

References Cited by the Examiner

UNITED STATES PATENTS

| | | | |
|---|---|---|---|
| 2,631,955 | 3/1953 | Muskat | 117—126 |
| 2,654,717 | 10/1953 | Rehberg | 117—124 |
| 2,901,377 | 8/1959 | Moers | 117—72 X |
| 2,908,602 | 10/1959 | Collardeau | 117—72 X |
| 2,978,354 | 4/1961 | Lesser | 117—72 X |
| 3,010,929 | 11/1961 | Jones | 117—161 |
| 3,051,585 | 8/1962 | Weinberg | 117—72 X |

FOREIGN PATENTS 1,025,302  2/1958  Germany.

RICHARD D. NEVIUS, *Primary Examiner.*

JOSEPH B. SPENCER, *Examiner.*

A. GOLIAN, *Assistant Examiner.*